RICE & HITCHCOCK.
Cultivator.
No. 70,472.
Patented Nov. 5, 1867.
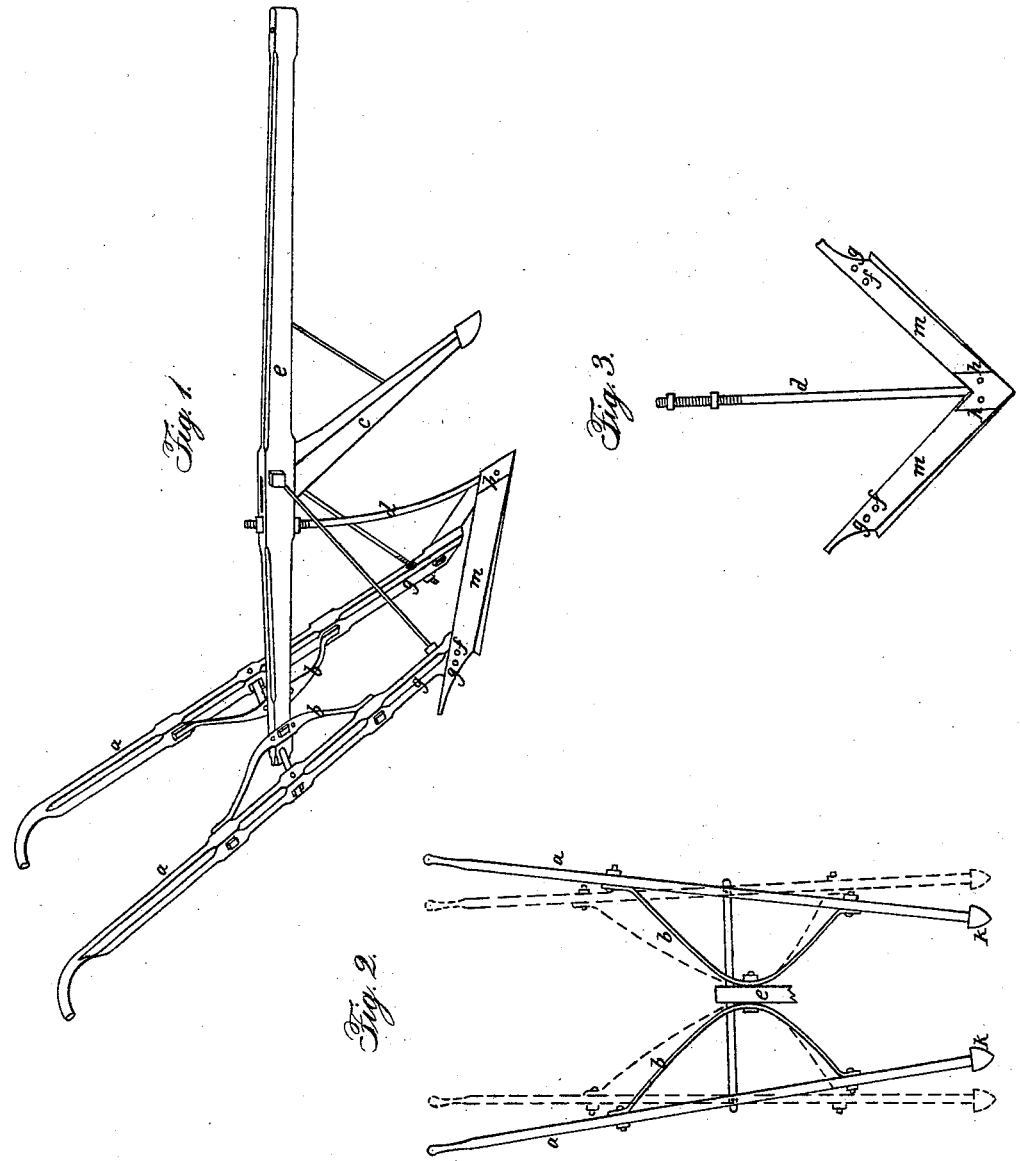
Witnesses:
Inventor:

UNITED STATES PATENT OFFICE.

TIMOTHY RICE AND LUKE R. HITCHCOCK, OF CANEADEA, NEW YORK.

HORSE-HOE.

Specification forming part of Letters Patent No. 70,472, dated November 5, 1867; antedated October 13, 1867.

*To all whom it may concern:*

Be it known that we, TIMOTHY RICE and LUKE R. HITCHCOCK, of the town of Caneadea, county of Allegany, and State of New York, have invented a new and useful Improvement in Horse-Hoes for the cultivation of garden and field crops; and we do hereby declare that the following is a full and clear and exact description of the construction and operation of the same, reference being had to the annexed drawings, making a part of this specification, in which—

Figure 1 is a perspective view. Fig. 2 is a vertical view of the handles and braces; and Fig. 3, a longitudinal elevation of the hoes.

$a$ $a$ represent the adjusted handles, with the curved perforated braces $b$ $b$ attached to the handles $a$ $a$ and beam $c$, to work the furrow to the desired width, as shown by the dotted lines at Fig. 2. Any of the known kinds of cultivator teeth or plows can be used on the handles $a$ $a$ or beam-leg $c$. The double moldboard hoe $m$ $m$, with the adjustable rod $d$ passing through and secured to the beam $c$, to raise and lower the point. The hoe can be moved up on the handle $a$ $a$ by changing the bolts $f$ $f$ to $g$ $g$, thereby admitting the teeth or plows $k$ $k$ to be attached to the handles at the same time with the hoe—that is, to use the hoe in conjunction with the teeth or plow, or not, at the pleasure of the operator; also the loosening of the bolts $h$ $h$ to accommodate the hoe to the spread or contraction of the handles $a$ $a$, constructed as shown at Fig. 3, leaving the furrow clear of weeds, and throwing the loose fine earth completely around and among the plants.

We do not claim the adjustability of the teeth or plow by means of perforated braces or rods, as new, or the double-share hoe; but What we do claim is—

The composition of the curved perforated braces and hoe, as shown by Figs. 1 and 2, for the purpose of cultivating garden and field crops in the best and most desirable manner.

TIMOTHY RICE.
LUKE R. HITCHCOCK.

Witnesses:
EVERO JONES,
ERASTUS W. JOHNSON.